US012576580B2

(12) United States Patent
Fu et al.

(10) Patent No.: US 12,576,580 B2
(45) Date of Patent: Mar. 17, 2026

(54) SYSTEMS AND METHODS FOR ADDITIVE MANUFACTURING

(71) Applicant: CarbonForm Inc., Cupertino, CA (US)

(72) Inventors: Kun Fu, Newark, DE (US); Hao Wu, Savannah, GA (US); Danning Zhang, Cupertino, CA (US)

( * ) Notice: Subject to any disclaimer, the term of this patent is extended or adjusted under 35 U.S.C. 154(b) by 0 days.

(21) Appl. No.: 17/707,122

(22) Filed: Mar. 29, 2022

(65) Prior Publication Data

US 2022/0305716 A1    Sep. 29, 2022

(30) Foreign Application Priority Data

Mar. 29, 2021    (CN) .......................... 202110334786.0

(51) Int. Cl.
| | |
|---|---|
| *B29C 64/10* | (2017.01) |
| *B29C 64/209* | (2017.01) |
| *B29C 64/245* | (2017.01) |
| *B29C 64/264* | (2017.01) |
| *B29C 64/295* | (2017.01) |

(Continued)

(52) U.S. Cl.
CPC ............ *B29C 64/10* (2017.08); *B29C 64/209* (2017.08); *B29C 64/245* (2017.08); *B29C 64/264* (2017.08); *B29C 64/295* (2017.08); *B33Y 10/00* (2014.12); *B33Y 30/00* (2014.12); *B33Y 40/10* (2020.01); *B33Y 70/10* (2020.01)

(58) Field of Classification Search
CPC ... B29C 64/264; B29C 64/295; B29C 64/209; B29C 64/245; B29C 64/218; B29C 64/00; B29C 70/00; B29C 70/30; B33Y 30/00
See application file for complete search history.

(56) References Cited

U.S. PATENT DOCUMENTS

| | | | | | |
|---|---|---|---|---|---|
| 2002/0062909 A1* | 5/2002 | Jang | ...................... | B33Y 10/00 | |
| | | | | 156/307.3 | |
| 2016/0067928 A1* | 3/2016 | Mark | ...................... | B29C 70/16 | |
| | | | | 425/150 | |

(Continued)

FOREIGN PATENT DOCUMENTS

| | | | | | | |
|---|---|---|---|---|---|---|
| CN | 109130185 | A | * | 1/2019 | ........... | B29C 64/209 |
| CN | 110154383 | A | * | 8/2019 | | |
| CN | 110712366 | A | * | 1/2020 | ........... | B29C 64/118 |
| EP | 3418032 | A1 | * | 12/2018 | ........... | B29C 64/118 |
| WO | WO-2021038503 | A1 | * | 3/2021 | ............. | B29B 15/12 |

OTHER PUBLICATIONS

Gao, S., et al. "English Machine Translation of CN109130185A: Rolling type continuous fiber photo-curing 3D printing device." EPO. Espacenet. 2023 (Year: 2023).*

(Continued)

*Primary Examiner* — Susan D Leong
*Assistant Examiner* — Jonathan B Woo

(57) ABSTRACT

A 3D printing system for continuous fiber reinforced composite materials is provided. The 3D printing system does not require the fiber and resin to be premixed before they are used in 3D printing. Instead, the 3D printing system includes a guiding device that deposits fiber preform onto a build plate to form a predetermined shape, a preparation module that processes the fiber preform, a dispenser that dispenses a resin material on the fiber preform, a heater that applies heat to the mixture of the fiber preform and the resin materials to form a composite material, and a curing module that applies pressure and heat to cure the composite material.

13 Claims, 4 Drawing Sheets

(51) Int. Cl.
| | |
|---|---|
| *B33Y 10/00* | (2015.01) |
| *B33Y 30/00* | (2015.01) |
| *B33Y 40/10* | (2020.01) |
| *B33Y 70/10* | (2020.01) |

(56) References Cited

U.S. PATENT DOCUMENTS

| | | | |
|---|---|---|---|
| 2018/0154580 A1* | 6/2018 | Mark ..................... | B22D 11/01 |
| 2018/0370129 A1* | 12/2018 | Natale .................. | B29C 64/209 |
| 2019/0160761 A1* | 5/2019 | Tai ........................ | B29C 70/545 |
| 2019/0202117 A1* | 7/2019 | Alfson ................. | B29C 64/209 |
| 2019/0275755 A1* | 9/2019 | Ihn ........................ | B29C 70/545 |
| 2019/0315056 A1* | 10/2019 | Stuart .................. | B29C 64/245 |
| 2022/0040919 A1* | 2/2022 | Czasny ................. | B33Y 10/00 |
| 2022/0048246 A1* | 2/2022 | Fu ........................... | B29C 70/38 |

OTHER PUBLICATIONS

The State Intellectual Property Office of People's Republic of China. "Translated First Notice of Examination of CN 202110334786". 2023. USPTO Global Dossier. (Year: 2023).*

The State Intellectual Property Office of People's Republic of China. "Translated Second Notice of Examination of CN 202110334786". 2024. USPTO Global Dossier. (Year: 2024).*

Li, D. "English Machine Translation of Description of CN 110712366 A". 2024. EPO. Espacenet. (Year: 2024).*

Li, D. English Machine Translation of Description of CN 110154383 A. 2024. EPO. Espacenet. (Year: 2024).*

The State Intellectual Property Office of People's Republic of China. "Third Office Action of CN 202110334786". Jul. 15, 2024. EPO. Espacenet. (Year: 2024).*

* cited by examiner

400

402
Depositing a first material on a build plate to form a predetermined shape

404
Processing the first material deposited on the build plate

406
Depositing a second material on top of the first material

408
Applying heat to a local area of the first and second materials

410
Applying pressure to the first and second material

SYSTEMS AND METHODS FOR ADDITIVE MANUFACTURING

BACKGROUND

1. Field of the Invention

The present invention relates generally to additive manufacturing (or 3D printing), and more particularly, but not by way of limitation, to apparatuses, systems, and methods for composite materials additive manufacturing.

2. Cross-Reference to Related Applications

This application claims priority to Chinese patent application No. 2021103347860, filed on Mar. 29, 2021, and entitled, "Additive Manufacturing Systems and Additive Manufacturing Methods," the entire contents of which are herein incorporated by reference.

3. Description of Related Art

Traditional manufacturing processes and systems have been found inadequate in modern day manufacturing, where high speed, high accuracy, and high efficiency are often required. Further, modern manufacturing often requires the manufacture of highly complex objects or objects with irregular shapes. To meet these manufacturing needs, three-dimensional (3D) printing, which is also known as additive manufacturing, has been recently developed. 3D printing has become one of the most popular printing methods because of its various advantages over traditional two-dimensional (2D) printing. Using 3D printing, highly complex objects with irregular shapes can be easily printed, compared to traditional manufacturing methods that requires extensive modeling to manufacture such objects. Therefore, 3D printing can greatly reduce the cost of manufacturing, and reduce the cycles for research and development in many fields.

In addition, continuous fiber reinforced composite materials have the advantages of having low density and high strength. Therefore, they have been widely used in areas such as aerospace, automobiles, ships, constructions, oil drilling, medical devices, sports equipment, and consumer electronics.

However, traditional composite materials manufacturing requires complex manufacturing processes and comes with high costs. Further, prior art 3D printing systems require that the fiber and resin are pre-mixed and the mixture is squeezed out from a nozzle while printing. This means that an additional step of premixing the fiber and resin is required before printing and that only a limited number of fiber choices can be used in prior art 3D printing. In addition, using premixed fiber and resin further limits the size of the dispenser used in traditional 3D printing and therefore limits the printing speed. Other limits of traditional 3D printing include low fiber/resin mix ratio, low mechanical performance of the printed objects, among others.

Objectives of the 3D printing systems and methods disclosed in the present invention are therefore to improve the above described shortcomings of prior art 3D printing systems and methods.

SUMMARY

One object of the present disclosure is to disclose 3D printing systems and methods for continuous fiber reinforced composite materials. Particularly, the disclosed 3D printing system does not require the fiber and resin to be premixed before they are used in 3D printing. Instead, the disclosed 3D printing system feeds a fiber preform into a printer head, where resin is added to the fiber preform, and the mixture is processed and cured by applying, e.g., heat and pressure, to the mixture to form a composite material. This process removes a lot of limitations on what kind of fiber can be used in the 3D printing system, and gives the present invention flexibility to choose from a wide variety of fibers in different forms and with different properties. Utilizing the disclosed 3D printing systems and methods to fabricate continuous fiber reinforced composites can realize flexible part design, and achieve high printing efficiency and speed, and save resources, energy, and time.

In one aspect of the present disclosure, the 3D printing system may include a guiding module to deposit fiber preform material on a build plate to form a predetermine shape, a preparation module to process the fiber preform, a dispenser to dispense a resin material on the fiber preform, a heater to apply a heat to the mixture of the fiber preform and resin to form a composite material, and a curing module to apply pressure and heat to the composite material to cure the composite material and fix it to the build plate.

The fiber preform may be carbon fibers, aramid fibers, glass fiber, natural fibers, steel fibers, silver fibers, copper fibers, multi-component fibers, or any combination thereof. The resin may be a thermosetting resin. The preparation module may be configured to process the first material before the second material is deposited on the first materials, such as adding an adhesive layer to the fiber preform, functional groups grafting, plasma etching, plasma surface grafting, Ozone cleaning, surface energy activation, adding a sizing agent, and functionalizing the surface of the fiber preform.

The guiding module, preparation module, dispenser, heater, and curing module may be included in a movable module, which may be called a deposition head system. The deposition head system is connected to a driver module, such as a mechanical arm, which moves the deposition head system in a 3D space. When printing, the deposition head system may move along a line that is parallel to the fiber direction of the fiber preform. The deposition head system may also be positioned inside a temperature controlled chamber in order to improve the printing performance.

Details associated with the embodiments described above and others are presented below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted), meaning the sizes of the depicted elements are accurate relative to each other for at least the embodiment depicted in the figures.

DESCRIPTION OF ILLUSTRATIVE EMBODIMENTS

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system or apparatus that "comprises," "has," "includes" or "contains" one or more elements possesses those one or more elements, but is not limited to possessing only those elements. Likewise, a method that "comprises," "has," "includes" or "contains" one or more steps possesses those one or more steps, but is not limited to possessing only those one or more steps.

Further, a structure (e.g., a component of an apparatus, such as a cable) that is configured in a certain way is configured in at least that way, but it can also be configured in other ways than those specifically described.

Figure 1:
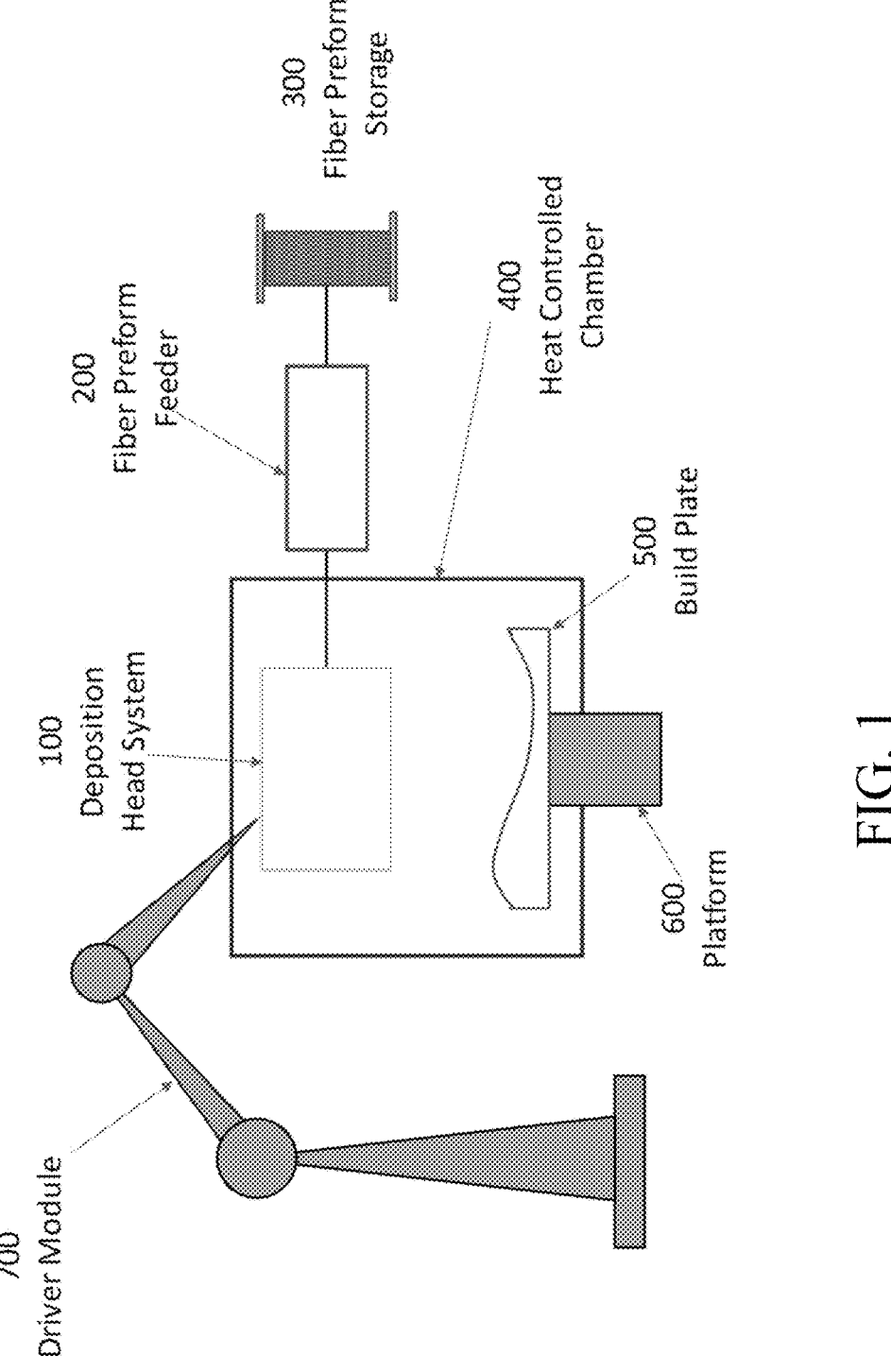
FIG. 1 illustrates a system for 3D printing according to one aspect of the present disclosure.

FIG. 1 illustrates an example of a 3D printing system 1000. In the depicted embodiment, 3D printing system 1000 includes a deposition head system 100, which may be coupled to a driver module 700 (such as a mechanical arm). The 3D printing system 1000 is further coupled to a fiber preform feeder 200, which is in turn coupled to a fiber preform storage 300. The deposition head system 100 is configured to dispense materials on a building plate 500 under the control of driver module 700. In some embodiments, the deposition head system 100 and the building plate may be included in a heat controlled chamber 400, which may be supported by a platform 600. In some embodiment, fiber preform feeder 200 and/or fiber preform storage 300 may be included inside the chamber 400. In a preferred embodiment, the fiber preform feeder 200 and fiber platform storage 300 are located outside of the chamber 400 to leave more space for the deposition head system 100 inside the chamber 400.

Figure 2:
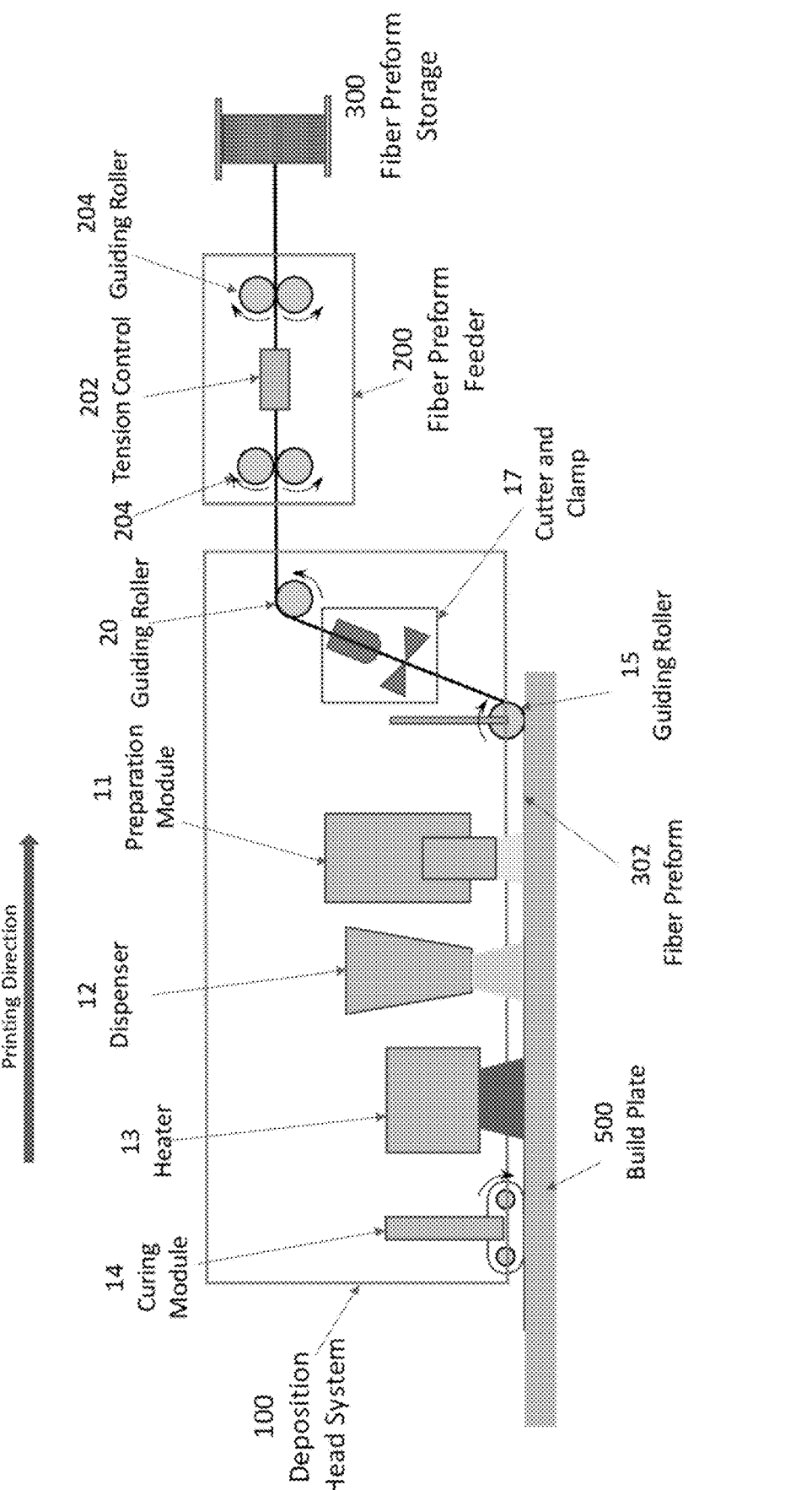
FIG. 2 illustrates an example of a 3D printing subsystem for according to one aspect of the present disclosure.

FIG. 2 illustrates a more detailed view of the 3D printing system 1000. In the depicted embodiment, the deposition head system 100 includes a preparation module 11, a dispenser 12, a heater 13, a curing module 14 (such as a compaction roller), and a guiding roller 15. The deposition head system 100 is coupled to the fiber preform feeder 200, which is in turn coupled to a fiber preform storage 300. The fiber preform feeder 200 may include a tension control 202 and a set of guiding rollers 204. The 3D printing system may also include a cutter and clamp 17, which may be positioned inside or outside of the deposition head system 100. Further, the cutter and clamp 17 can be positioned to the left or right side of the guiding roller 15. The deposition head system 100 is configured to be movable, e.g., under the control of driver module 700, and all components included inside the deposition head system 100 may move together with the deposition head system 100.

Figure 3:
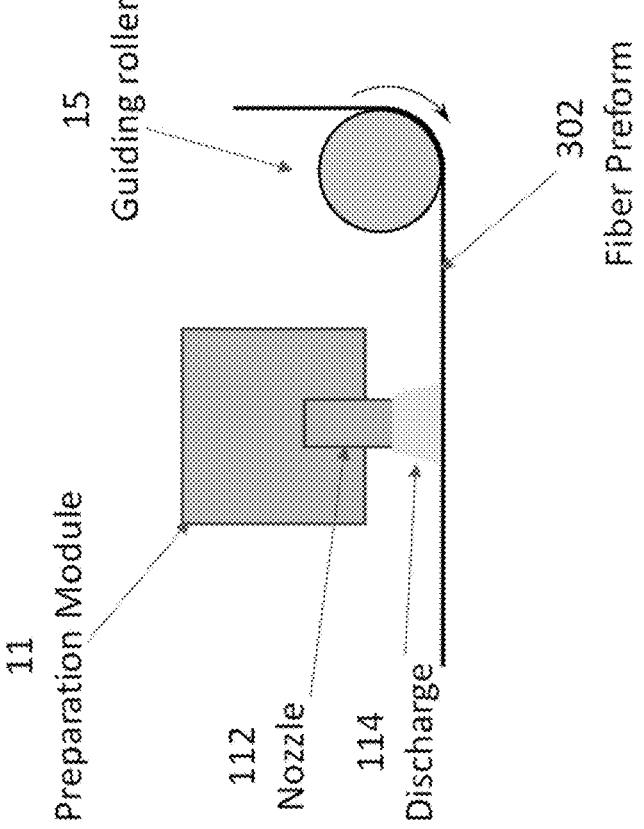
FIG. 3 illustrates an example of a 3D printing subsystem for additive according to one aspect of the present disclosure.

FIG. 3 illustrates an example of a preparation module 11. In the depicted embodiment, the preparation module includes a nozzle 112, which is configured to dispense discharge 114 from the preparation module 11.

Referring now to FIG. 2, fiber preform may be stored in the fiber preform storage 300, which may include a roller, and the fiber preform is rolled around the roller. For example, the fiber preform can be carbon fibers, aramid fibers, glass fiber, natural fibers, steel fibers, silver fibers, copper fibers, multi-component fibers, or any combination thereof. The fiber preform may be in the form of rovings (untwisted), yarns (twisted), woven, non-woven, braided, knitted, 2D and 3D fabrics, prepregs, thermosetting or thermoplastic coated fibers, or hybrid rovings or yarns or fabrics.

The fiber preform is fed into fiber preform feeder 200, where the tension control 202, with the assistance of guiding rollers 204, pulls the fiber preform out from storage 300 and then fed the fiber preform into deposition head system 100. Guiding rollers 15 and 20 then guide the fiber preform and deposits it on the top surface of the building plate 500. Utilizing the movement of the guiding roller 15 and the deposition head system, the fiber preform may be deposited on the surface of the building plate 500 to form a predetermined or target shape. The predetermined or target shape may be determined on the specific design and shape of the device that the 3D printing system is printing.

The cutter and clamp 17, which is positioned between fiber preform feeder 200 and the deposition head system 100 are configured to cut the fiber preform when necessary. The cutter and clamp 17 may include laser or mechanic scissors configured to cut and clamp fiber preform. For example, the deposition head system 100 may start at the left end of the building plate and deposit the fiber preform from left to the right on the building plate, and when the deposition head system 100 moves along the printing direction to the right end of the building plate, and thus finishing depositing a new layer of materials on the build plate, the cutter and clamp 17 cuts the fiber preform before the building of the next layer starts.

In one embodiment, the deposition head system 100 moves along a line (e.g., the printing direction as shown in FIG. 2) that is parallel to the fiber direction of the fiber preform as it is positioned on the fiber perform. The dispenser 12, heater 13 and compact roller 14 are positioned in a line that is parallel to the printing direction, which is also parallel to the fiber direction. In a preferred embodiment, following the printing direction, dispenser 12 is positioned in the front of the line, heater 13 is position in the middle, and the curing module 14 is positioned in the back. For example, in FIG. 2, the deposition head system 100 moves along the printing direction from left to the right, and therefor dispenser 12 is positioned to the right side of heater 13, which is in turn positioned to the side of curing module 14. If the printing direction is reversed and the deposition head system 100 moves from the right to the left, the relative position of the dispenser 12, heater 13, and curing module 14 should also be reversed. However, in some other embodiments, the relative positions of the dispenser 12, heater 13, and curing module 14 may be changed, as long as the three components are aligned along a line that is parallel to the fiber direction. For example, the relative positions of dispenser 14 and heater 13 may be switched so that dispenser 12 is positioned between heater 13 and curing module 14.

The cutter and clamp 17 may be positioned inside or outside of the deposition head system 100. In a preferred embodiment, the cutter and clamp 17 is positioned inside of the deposition head system 100 so that it moves along with the deposition head system to more accurately cut the fiber preform, and therefore better control the shape of the object to be printed and the accuracy of the 3D printing system.

The preparation module 11 may be configured to clean and/or activate the surface of the fiber preform in order to change properties of the fiber preform, such as wetting and interfacial properties. For example, the preparation module may add an adhesive layer to the fiber preform (such as adhesive spray) or functional groups grafting (such as —COOH, —OH), plasma etching, plasma surface grafting, Ozone cleaning treatment, surface energy activation, or adding a sizing agent (such as silane or urethane). The preparation module may also functionalize the surface of the fiber preform, such as adding functional powders or particles to the surface of the fiber preform. Functional powders or particles may include polymer powders, thermosetting or thermoplastic polymer powders, metal (such as Al, Fe) or metal oxide powders (such as $Al_2O_3$, $Fe_2O_3$, $Fe_3O_4$) and conductive wires, ceramic powders (such as SiC, $SiO_2$) and wires, or nano-materials (such as carbon black, carbon nano tubes, graphene, graphite, boron nitride, or Mexene).

The dispenser 12 may be configured to deposit a second material on the fiber preform that has been prepared by the preparation module 11. The second material may be a fluid that can be sprayed, such as using a nozzle, onto the prepared fiber preform. The second material may also be viscous that can be painted, such as using a roller, onto the prepared fiber preform. For example, the second material may be resin, such as a thermosetting resin (e.g., unsaturated polyester, epoxy, phenolic, vinyl ester, thermosetting polyurethane, silicone, polyimide, bismaleimide, polycarbosilane), or ultra-violet (UV) cured thermoset (e.g., acrylic epoxy resin, acrylic polyester, acrylic polyurethane, etc.). The resin can also be added with additives, such as UV absorbers, antioxidants, quenchers, lubricants, plasticizers, or flame retardants. For example, lubricants can include fatty alcohols, acids and esters or hydrocarbons; plasticizers can include phthalates, glycolic acid esters or polychlorinated hydrocarbons; flame retardants can include halogenated, non-halogenated, etc.

In some embodiments, the heater 13 may be configured to provide local area heating using laser, infrared light, microwave, or plasma. The heater 13 is configured to provide local area heating to the materials on surface of the build platform. When heating is applied to the fiber preform where the second materials is applied, it creates a temperature difference between the heated area and adjacent non-heated area. Because the viscosity of the second material is reduced at the high temperature area, it flows to the heated area and cured on the fiber preform, thereby forming a composite material in the predetermined or target shape.

The curing module 14 is configured to apply pressure and heat to the composite material formed by the fiber preform and the second material, thereby fixing a layer of the composite material onto the build plate. The curing module 14 may include pressure source, a heating component, and a compaction roller. The compaction roller is pressed onto the composite material, and heat is applied to the compaction roller, thereby heating the composite materials. Under the pressure and heat, the 3D printing system can control the thickness of the composite material layer and achieve high density and low porosity. By applying both pressure and heat, the 3D printing system can achieve a degree of cure of over 95%.

In the depicted embodiment, the compaction roller is positioned on the left side of the deposition head system 100, and the preparation module is on the right side. Therefore, the deposition head system 100 moves from left to the right along the printed direction as shown in FIG. 2. As the deposition head system 100 moves from the left to the right, fiber preform are continuously deposited on to the build plate 500 using the fiber preform feeder 200 and guiding rollers 15 and 20 to form a predetermined or target shape, the fiber preform are prepared by the preparation module 11, the second material is deposited onto the fiber preform by dispenser 12, and the heater 13 applies heat to the materials to form a composite material, and finally the compaction roller applies pressure and heat to cure the composite material and press it onto the build plate, forming a new layer on the build plate. When the deposition head system 100 reaches the end of the right end of the build plate 500, it moves back to the left end of the build plate 500 and repeats the process again, thereby keeping adding new layers to the build plate 500. By repeating this process, new layers of the predetermined or target shape are formed, and fixed onto the build plate 500 to eventually complete the printing of the 3D object.

In the depicted embodiment, the 3D printing system begins the printing on a build plate 500, but it keeps adding new layers to the previously printed layers. The build plate 500 may be a rigid platform (such as a steel platform) or an elastic platform (such as a silicone platform). The build plate may have a flat surface or a surface with certain predetermined topography. The build plate may also have a heating system to heat the 3D printing materials placed on it.

As shown in FIG. 1, the 3D printing system may also include a chamber 400, which has temperature/heat and/or pressure controls. The deposition head system 100 and build plate 500 may be placed inside the chamber 400.

The 3D printing system also has a driver module 700 coupled to the deposition head system 100 and configured to move the deposition head system 100 in a desired direction. The driver module 700 can be a six-axis robotic arm which can print complex 3D objects, which may improve the applicability of the printing. The driver module can also be a gantry XYZ frame system, to control the deposition head system 100 move along the X, Y, Z directions.

According to the present disclosure, the 3D printing system provides local area heating to a first material (such as fiber preform), thereby creates a temperature difference between different areas of the fiber preform along the fiber direction. A second material (such as thermosetting resin in the fluid form) that is deposited on the surface of the first material, has a lower viscosity in the high temperature area (compared to the low temperature area) of the first material, which creates capillary action that causes the second material to flow into the gaps between the fibers of the first material. Further, the high temperature causes the fluid resin solidify and harden while the resin moves on the surface of the first materials, and therefore a layer of composite material is formed via the reactions between the first and second materials. The process is repeated to form 3D object as the composite materials forms and solidifies layer by layer. The capillary action may even cause the fluid second material to move upwards against the gravity, and spread among the fibers of the first materials. The spread of the second material under the capillary action among the gaps between the fibers of the first material improves the densification of the formed composite material, which has a high fiber volume and therefore improved material quality.

Further, the disclosed 3D printing system has a guiding device (such as guiding rollers 15, 20) that deposits the first material in a predetermined or target shape before it solidifies. Therefore, no further step is required to form the composite material into a predetermined or target shape, which increases the speed and efficiency of 3D printing. In addition, the compaction roller can apply both pressure and heat at the same time to the composite material, which increases the density and reduces the porosity of the composite material. Using this technique, the 3D printing system can achieve a degree of cure of 95% and more. The preparation module can prepare the first material (such as surface activation or functionalization) before the second material is deposited onto the first material to make it easier for the first and second material to react and form a more stable composite material.

Figure 4:
FIG. 4 illustrates a method of 3D printing according to one aspect of the present disclosure.
Figure 4:
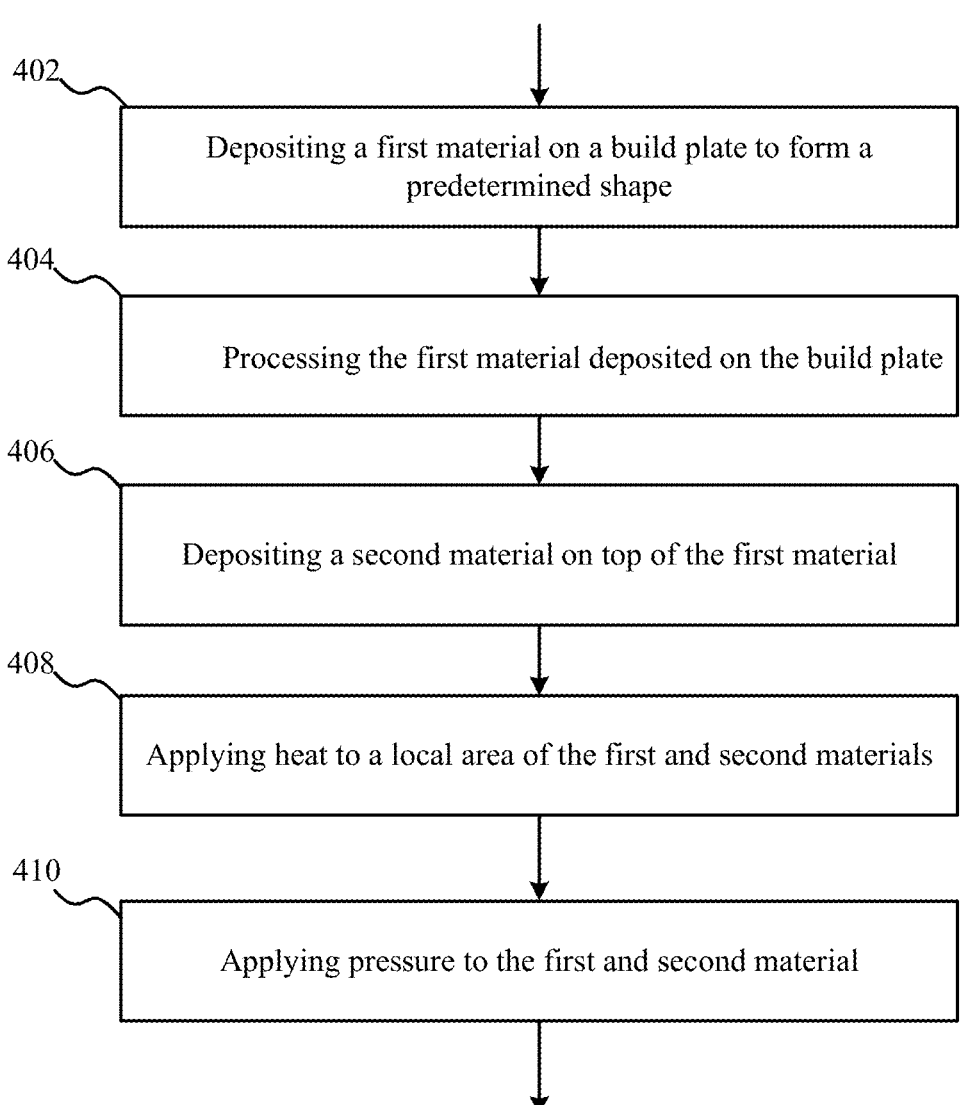

FIG. 4 illustrates a method 400 for 3D printing in accordance to the 3D printing system described above. In the depicted embodiment, method 400 includes providing 402 a first material on a build plate to form a predetermined or a target shape. The first material may be fiber preform, as disclosed above and may be any one of the example materials provided above. The first material may be deposited on the building plate using a guiding device, such as guiding rollers 15 and 20 as depicted in FIG. 2.

At step 404, the first material is processed by a preparation module, such as preparation module 11 described above. The processing may include cleaning the first material, activating the first material, changing the moisture and/or smoothness of the first materials, adding a functional coating to first material, or any other processing performed by preparation module 11 as described above.

At step 406, a second material is deposited on the first material via, e.g., a dispenser 12 as described above. The second material may be a fluid or viscose material. It may be any of the example thermosetting resins described above.

At step 408, heat is applied to a local area of the first and second materials deposited into the predetermined shape. The heat may be applied by a heater such as heater 13 described above, which may provide heating using laser, infrared light, microwave, or plasma, or any other heat sources described above. The applied heat may cause the first and second material to react and form a composite material.

At step 410, pressure is applied to the first and second material using, e.g., a curing module 14 as described above. The curing module 14 may apply both pressure and heat at the same time to the first and second materials, thereby speeding up the formation of the composite material from the first and second materials, and may also speed up the curing of the composite material. A layer of composite material is therefore formed and fixed onto the build plate.

The steps above may be repeated as many times as needed to form multiple layers of composite materials on the build plate, and thereby prints a 3D object in the predetermined shape. It should be also noted that although the steps of the method 400 is described in a certain order, in certain embodiments any of the above steps do not necessarily follow the order that it is described above.

The above specification and examples provide a complete description of the structure and use of exemplary embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the present devices are not intended to be limited to the particular forms disclosed. Rather, they include all modifications and alternatives falling within the scope of the claims, and embodiments other than the one shown may include some or all of the features of the depicted embodiment. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

What is claimed is:

1. An additive manufacturing system, comprising:
   a guiding module configured to deposit a fiber preform on a build plate;
   a preparation module configured to perform plasma surface grafting or plasma etching to activate a surface of the fiber preform after the fiber preform is deposited on the build plate and before a resin material is deposited on the fiber preform;
   a dispenser configured to deposit the resin material on the fiber preform, wherein the dispenser is configured to spray the resin material in a liquid state on the fiber preform via a nozzle after the fiber preform is deposited on the build plate; and
   a heating module configured to apply heat to at least a portion of the fiber preform and the resin material after the fiber preform and the resin material are deposited on the build plate, thereby causing the fiber preform and the resin material to form a composite material;
   wherein the guiding module, the preparation module, the dispenser, and the heating module are enclosed in a single movable housing and configured to operate simultaneously as the guiding module, the preparation module, the dispenser, and the heating module move with the movable housing along a printing direction determined by a predetermined shape of a printing target; and
   wherein along the printing direction the preparation module is positioned behind the guiding module, the dispenser is positioned behind the preparation module, and the heating module is positioned behind the dispenser.

2. The additive manufacturing system of claim 1, wherein the fiber preform is selected from the group of: carbon fibers, aramid fibers, glass fibers, natural fibers, steel fibers, silver fibers, copper fibers, multi-component fibers, or any combination thereof.

3. The additive manufacturing system of claim 1, wherein the fiber preform is selected from the group of: rovings (untwisted), yarns (twisted), woven, non-woven, braided, knitted, 2D and 3D fabrics, prepregs, thermosetting or thermoplastic coated fibers, or hybrid rovings or yarns or fabrics.

4. The additive manufacturing system of claim 1, wherein the resin material is a thermosetting resin.

5. The additive manufacturing system of claim 4, wherein the thermosetting resin is selected from the group of: unsaturated polyester, epoxy, phenolic, vinyl ester, thermosetting polyurethane, silicone, polyimide, bismaleimide, polycarbosilane, or ultra-violet (UV) cured thermoset such as acrylic epoxy resin, acrylic polyester, or acrylic polyurethane.

6. The additive manufacturing system of claim 1, wherein the preparation module is further configured to functionalize the surface of the fiber preform.

7. The additive manufacturing system of claim 1, further comprising a curing module configured to apply both pressure and heat to the composite material to cure the composite material.

8. The additive manufacturing system of claim 7, wherein the curing module is enclosed in the movable housing together with the guiding module, the preparation module, the dispenser, and the heating module.

9. The additive manufacturing system of claim 1, wherein the movable housing is configured to move along a line substantially parallel to a longitudinal direction of the fiber preform.

10. The additive manufacturing system of claim 1, further comprising a temperature controlled chamber, wherein the movable housing and at least a portion of the build plate are positioned inside the temperature controlled chamber.

11. The additive manufacturing system of claim 1, wherein the printing direction is substantially parallel to a top surface of the build plate.

12. The additive manufacturing system of claim 1, wherein the preparation module is configured to add functional materials to the surface of the fiber preform.

13. The additive manufacturing system of claim 1, wherein the preparation module is configured to clean the surface of the fiber preform.

* * * * *